United States Patent
Liu et al.

(10) Patent No.: US 12,056,320 B2
(45) Date of Patent: *Aug. 6, 2024

(54) DISPLAY DEVICE, TOUCH PANEL AND MANUFACTURING METHOD THEREOF

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Chunjian Liu, Beijing (CN); Jian Tian, Beijing (CN); Xintao Wu, Beijing (CN); Jie Lei, Beijing (CN); Jie Wang, Beijing (CN); Zouming Xu, Beijing (CN); Tianqing Liu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,913

(22) Filed: Jun. 29, 2023

(65) Prior Publication Data
US 2023/0341979 A1 Oct. 26, 2023

Related U.S. Application Data

(63) Continuation of application No. 17/413,048, filed as application No. PCT/CN2020/114310 on Sep. 10, 2020, now Pat. No. 11,740,743.

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 2203/04103* (2013.01); *G06F 2203/04107* (2013.01)

(58) Field of Classification Search
CPC ...... G06F 3/041–047; G06F 2203/041–04114; G06F 3/04164; H10K 59/40
See application file for complete search history.

(56) References Cited

U.S. PATENT DOCUMENTS

| | | |
|---|---|---|
| 8,928,597 B2 | 1/2015 | Jang |
| 9,294,089 B2 | 3/2016 | Long et al. |

(Continued)

FOREIGN PATENT DOCUMENTS

| | | |
|---|---|---|
| CN | 102193700 A | 9/2011 |
| CN | 102193700 B | 7/2015 |

(Continued)

OTHER PUBLICATIONS

CN-108614649-B with Translation (Year: 2020).*
Written Opinion from PCT/CN2020/114310 dated May 28, 2021.

*Primary Examiner* — Sanjiv D. Patel
(74) *Attorney, Agent, or Firm* — XSENSUS LLP (57) ABSTRACT

A touch panel includes: a substrate; a bridging layer; an insulating layer; and a touch layer, including a first touch area and a border area surrounding the first touch area; the border area includes at least one second touch area, and the second touch area includes a plurality of button portions; a second shielding body is disposed between the second touch area and the first touch area; the border area further includes a bonding area for bonding with a driving circuit board; the second shielding body is provided with at least one wire groove, and at least one touch wire is coupled to the bonding area by passing through the wire groove; and the touch layer is disposed on a surface of the insulating layer away from the (Continued)

substrate, and at least two adjacent shielding units are coupled by the bridging layer.

20 Claims, 2 Drawing Sheets

(56) References Cited

U.S. PATENT DOCUMENTS

| | | |
|---|---|---|
| 9,893,126 B2 | 2/2018 | Jang |
| 10,936,132 B2 | 3/2021 | Jang |
| 2010/0110041 A1 | 5/2010 | Jang |
| 2013/0088372 A1 | 4/2013 | Lundstrum et al. |
| 2014/0293163 A1 | 10/2014 | Ju et al. |
| 2015/0103030 A1 | 4/2015 | Jang |
| 2018/0166508 A1 | 6/2018 | Jang |
| 2019/0034013 A1 | 1/2019 | Hu et al. |
| 2019/0042019 A1 | 2/2019 | Ding et al. |
| 2019/0376852 A1 | 12/2019 | Kobayashi et al. |

FOREIGN PATENT DOCUMENTS

| | | | |
|---|---|---|---|
| CN | 204719367 U | 10/2015 | |
| CN | 105320320 A | 2/2016 | |
| CN | 106020552 A | 10/2016 | |
| CN | 108958541 A | 12/2018 | |
| CN | 108958542 A | 12/2018 | |
| CN | 106020552 B | 6/2019 | |
| CN | 110633029 A | 12/2019 | |
| CN | 108614649 B * | 11/2020 | ........... G06F 3/0412 |
| WO | 2020/001179 A1 | 1/2020 | |

* cited by examiner

DISPLAY DEVICE, TOUCH PANEL AND MANUFACTURING METHOD THEREOF

CROSS-REFERENCE TO RELATED APPLICATIONS

This application is a CA of U.S. application Ser. No. 17/413,048, filed on Jun. 11, 2021, which is the national phase application under 35 U.S.C. § 371 of International Patent Application No. PCT/CN2020/114310 filed on Sep. 10, 2020, the disclosure of each is incorporated by reference in its entirety herein.

TECHNICAL FIELD

The present disclosure relates to the field of touch technologies, and in particular, to a display device, a touch panel and a manufacturing method thereof.

BACKGROUND

At present, in a display device with a touch function, multiple touch buttons may be arranged in a broader area outside a display area where touch operations may be achieved. In particular, in a display device used for a vehicle central control system, touch buttons have been widely used instead of physical buttons. However, there is a significant difference between light reflection and light refraction effects in an area where the touch buttons are located and that in the display area, which makes optical uniformity of the display device poor and affects a display effect.

It should be noted that the information disclosed in the Background section above is only for enhancing the understanding of the background of the present disclosure, and thus may include information that does not constitute prior art known to those skilled in the art.

SUMMARY

The present disclosure provides a display device, a touch panel, and a manufacturing method of the touch panel.

According to an aspect of the present disclosure, there is provided a touch panel, including:
a substrate;
a bridging layer, disposed on a side of the substrate;
an insulating layer, covering the bridging layer; and
a touch layer, disposed on a side of the substrate and including a first touch area and a border area surrounding the first touch area; the border area includes at least one second touch area, and the second touch area includes a plurality of button portions; where
a second shielding body is disposed between the second touch area and the first touch area;
the border area further includes a bonding area for bonding with a driving circuit board; the second shielding body is provided with at least one wire groove, and the wire groove is configured to divide the second shielding body into a plurality of shielding units distributed at intervals, and at least one touch wire is coupled to the bonding area by passing through the wire groove; and
the touch layer is disposed on a surface of the insulating layer away from the substrate, and at least two adjacent shielding units are coupled by the bridging layer.

According to an aspect of the present disclosure, there is provided a display device, including:
a display panel, including a display area and a peripheral area surrounding the display area; and
a touch panel disposed on a side of the display panel, where
the touch panel includes:
a substrate;
a bridging layer, disposed on a side of the substrate;
an insulating layer, covering the bridging layer; and
a touch layer, disposed on a side of the substrate and including a first touch area and a border area surrounding the first touch area; wherein the border area includes at least one second touch area, and the second touch area includes a plurality of button portions; wherein
a second shielding body is disposed between the second touch area and the first touch area;
the border area further includes a bonding area for bonding with a driving circuit board; the second shielding body is provided with at least one wire groove, and the wire groove is configured to divide the second shielding body into a plurality of shielding units distributed at intervals, and at least one touch wire is coupled to the bonding area by passing through the wire groove; and
the touch layer is disposed on a surface of the insulating layer away from the substrate, and at least two adjacent shielding units are coupled by the bridging layer.

According to an aspect of the present disclosure, there is provided a touch panel, including:
a substrate;
a touch layer, disposed on a side of the substrate and including a first touch area and a broader area surrounding the first touch area; where the broader area includes at least one second touch area, and the second touch area includes a plurality of button portions; the plurality of button portions includes at least one mutual-capacitance button portion, and the mutual-capacitance button portion includes a first touch electrode, a second touch electrode, and a dummy electrode disposed in a same layer, and there is a gap between the first touch electrode and the second touch electrode, and the dummy electrode is disposed in the gap between the first touch electrode and the second touch electrode, and separated from the first touch electrode and the second touch electrode.

In an exemplary embodiment of the present disclosure, the gap between the first touch electrode and the second touch electrode extends along a curved or fold line track; the dummy electrode is a strip structure extending along an extending direction of the gap; a center line of the dummy electrode coincides with a center line of the gap and has a same length as the center line of the gap in the extending direction of the gap.

In an exemplary embodiment of the present disclosure, a distance between the dummy electrode and the first touch electrode is 10 μm-30 μm; a distance between the dummy electrode and the second touch electrode is 10 μm-30 μm.

In an exemplary embodiment of the present disclosure, a first shielding body is disposed between two adjacent button portions in a same second touch area, and separated from the two adjacent button portions.

In an exemplary embodiment of the present disclosure, a second shielding body is disposed between the second touch area and the first touch area.

In an exemplary embodiment of the present disclosure, the periphery area further includes a bonding area for bonding with a driving circuit board; the button portions are coupled to the bonding area through touch wires; the second shielding body is provided with wire grooves, the wire grooves are configured to divide the second shielding body into a plurality of shielding units distributed at intervals, and at least a part of the touch wires is coupled to the bonding area by passing through the wire grooves;

the touch panel further includes:
a bridging layer, disposed on a side of the substrate; and
an insulating layer, covering the bridging layer;
the touch layer is disposed on a surface of the insulating layer away from the substrate, and at least two adjacent shielding units are coupled by the bridging layer.

In an exemplary embodiment of the present disclosure, the touch wire includes:
a first conductive layer, disposed on a same layer as the touch layer; and
a second conductive layer, disposed on a surface of the first conductive layer away from the substrate, and a boundary of an orthographic projection of the second conductive layer on the substrate coincides with a boundary of an orthographic projection of the first conductive layer on the substrate; and a material of the second conductive layer is metal.

In an exemplary embodiment of the present disclosure, the plurality of button portions in the same second touch area further include a self-capacitance button portion, and the self-capacitance button portion includes a third touch electrode disposed on a same layer as the first touch electrode and the second touch electrode.

In an exemplary embodiment of the present disclosure, the touch layer further includes:
a protection wire, disposed around the self-capacitance button portion, and configured to input a protection signal.

In an exemplary embodiment of the present disclosure, a ratio of a width of the protection wire to a distance between the protection wire and the self-capacitance button portion is not less than 4/3.

According to an aspect of the present disclosure, there is provided a manufacturing method of a touch panel, including:
providing a substrate
forming a touch layer on a side of the substrate, where the touch layer has a first touch area and an periphery area surrounding the first touch area; the periphery area includes at least one second touch area, and the second touch area includes a plurality of button portions; the plurality of button portions includes at least one mutual-capacitance button portion, and the mutual-capacitance button portion includes a first touch electrode, a second touch electrode, and a dummy electrode disposed in a same layer, and there is a gap between the first touch electrode and the second touch electrode, and the dummy electrode is disposed in the gap between the first touch electrode and the second touch electrode, and separated from the first touch electrode and the second touch electrode.

In an exemplary embodiment of the present disclosure, a first shielding body is disposed between two adjacent button portions in a same second touch area, and separated from the two adjacent button portions; and a second shielding body is disposed between the second touch area and the first touch area.

In an exemplary embodiment of the present disclosure, the periphery area further includes a bonding area for bonding with a driving circuit board; the button portions are coupled to the bonding area through touch wires; the second shielding body is provided with wire grooves, the wire grooves are configured to divide the second shielding body into a plurality of shielding units distributed at intervals, and at least a part of the touch wires is coupled to the bonding area by passing through the wire grooves;

Before forming the touch layer, the manufacturing method further includes:
forming a bridging layer on a side of the substrate; and
forming an insulating layer covering the bridging layer;
the touch layer is disposed on a surface of the insulating layer away from the substrate, and at least two adjacent shielding units are coupled by the bridging layer.

In an exemplary embodiment of the present disclosure, the touch wire includes:
a first conductive layer, formed simultaneously with the touch layer; and
a second conductive layer, disposed on a surface of the first conductive layer away from the substrate, and a boundary of an orthographic projection of the second conductive layer on the substrate coincides with a boundary of an orthographic projection of the first conductive layer on the substrate; and a material of the second conductive layer is metal.

According to an aspect of the present disclosure, there is provided a display device, including:
a display panel, including a display area and a peripheral area surrounding the display area;
the touch panel of any one of the above embodiments, where the touch panel is disposed on a side of the display panel, and the substrate is located on a side of the touch layer away from the display panel; an orthographic projection of the first touch area on the display panel is located in the display area, and an orthographic projection of the border area on the display panel is located in the peripheral area.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some according to the embodiments of the present disclosure, and other drawings may be obtained by those skilled in the art without departing from the drawings described herein.

DETAILED DESCRIPTION

Example embodiments will now be described more fully with reference to the accompanying drawings. However, the embodiments may be implemented in a variety of forms and should not be construed as being limited to the examples set forth herein; rather, these embodiments are provided so that the present disclosure will be more complete so as to convey the idea of the exemplary embodiments to those skilled in this art. The same reference numerals in the drawings denote the same or similar parts, and the repeated description thereof will be omitted. In addition, the drawings are merely schematic representations of the present disclosure and are not necessarily drawn to scale.

The terms "an", "a", "the", "said", and "at least one" are used to indicate that there are one or more elements/components or the like; the terms "include", "contain" and "have" are used to indicate the meaning of including in a non-exclusive way, and mean that there may be additional elements/components/etc. in addition to the listed elements/components/etc.; the terms "first", "second" and "third" etc. are used only as markers, and do not limit the number of objects.

Embodiments of the present disclosure provide a touch panel that may be used in a display device. The display device may include a display panel opposite to the touch panel. The display panel may be an OLED (Organic Light-Emitting Diode) display panel, or may also be a liquid crystal display panel.

As shown in FIGS. 1 to 4, the touch panel according to embodiments of the present disclosure includes a substrate 1 and a touch layer 2. The touch layer 2 is disposed on a side of the substrate 1, and includes a first touch area 21 and a border area 22 surrounding the first touch area 21. The border area 22 includes at least one second touch area 221, and the second touch area 221 includes a plurality of button portions 2211. The plurality of button portions 2211 includes at least one mutual-capacitance button portion 2211a, and the mutual-capacitance button portion 2211a includes a first touch electrode 210, a second touch electrode 220, and a dummy electrode 230 disposed in a same layer. There is a gap between the first touch electrode 210 and the second touch electrode 220, and the dummy electrode 230 is disposed within the gap between the first touch electrode 210 and the second touch electrode 220, and separated from the first touch electrode 210 and the second touch electrode 220.

In the touch panel according to the embodiments of the present disclosure, the dummy electrode 230 is disposed between the first touch electrode 210 and the second touch electrode 220 of the mutual-capacitance button portion 2211a, and a material of the dummy electrode 230 is the same as those of the first touch electrode 210 and the second touch electrode 220, so that light reflection and light refraction effects in an area between the first touch electrode 210 and the second touch electrode 220 approximate those in an area where the first touch electrode 210 and the second touch electrode 220 are located, thereby improving optical uniformity of the mutual-capacitance button portion 2211a.

The touch panel according to the embodiments of the present disclosure will be described in detail below.

Figure 1:
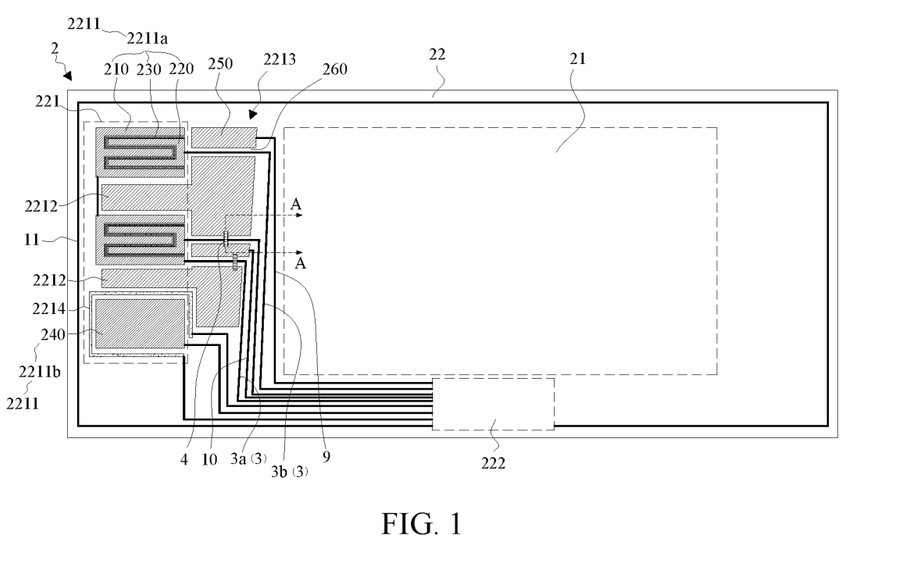
FIG. 1 is a schematic diagram of a touch layer in a touch panel according to an embodiment of the present disclosure.

As shown in FIG. 1, the substrate 1 may be in a flat-plate structure, and made from a transparent material. For example, the substrate 1 may be made from either a hard material such as glass or a flexible material such as polyimide, which is not particularly limited.

Figure 2:
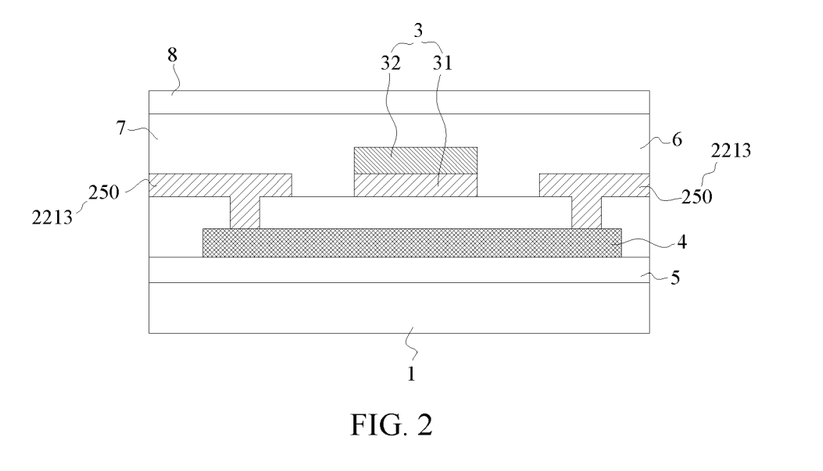
FIG. 2 is a cross-sectional view taken along a line A-A in FIG. 1.

As shown in FIGS. 1 and 2, the touch layer 2 is disposed on a side of the substrate 1. For example, in order to prevent impurities in the substrate 1 from affecting the touch layer 2, the side of the substrate 1 may be covered with a first blocking layer 5. The first blocking layer 5 may be made from at least one of silicon oxynitride, silicon oxide, and silicon nitride. Of course, it may also be made from other insulating materials. The touch layer 2 may be disposed on a surface of the first blocking layer 5 facing away from the substrate 1.

The touch layer 2 may be divided into at least a first touch area 21 and a border area 22 along its extending direction. The border area 22 surrounds the first touch area 21. The first touch area 21 may correspond to a display area of the display panel, so that a touch operation may be performed on the first touch area 21 according to a screen displayed in the display area. The first touch area 21 may include touch electrodes, and the touch electrodes may be made from ITO (Indium Tin Oxide) or another transparent conductive material.

In some embodiments of the present disclosure, the touch electrodes in the first touch area 21 include row touch electrodes and column touch electrodes disposed in a same layer. The row touch electrodes may be arranged along a column direction and extend in a row direction, and the column touch electrodes may be arranged along the row direction and extend in the column direction. Capacitances may be formed between the row touch electrodes and the column touch electrodes, so that a touch position may be determined by sensing an influence of a finger on the capacitances. A principle of mutual-capacitance touch will not be described in details here. Of course, touch electrodes in the first touch area 21 may also adopt a self-capacitance touch structure, which will not be described in detail here.

It should be noted that the row direction and the column direction in the present disclosure are used to refer to two directions perpendicular to each other, the row direction is not limited to be a horizontal direction, and the column direction is not limited to be a vertical direction. Those skilled in the art may know that actual orientations of the row direction and the column direction may be changed depending on rotation of the touch panel.

As shown in FIG. 1, the border area 22 may correspond to a peripheral area surrounding the display area in the display panel, and may be used to lay wires coupling the touch electrodes in the first touch area 21. Further, at least a part of the border area 22 may be used for realizing the touch function. Specifically, the border area 22 may include at least one second touch area 221, and the second touch area 221 includes a plurality of button portions 2211 that may also be configured for touching and thus replacing physical buttons.

In some embodiments of the present disclosure, a shape of the first touch area 21 may be a polygon with multiple edges, and the button portions 2211 in the same second touch area 221 are linearly distributed along a side of the first touch area 21. For example, the shape of the first touch area 21 is a rectangle with two long edges and two short edges, and there are two second touch areas 221 which are symmetrically distributed on two sides of the first touch area 21, and face toward the two short edges of the first touch area 21, respectively. In addition, the button portions 2211 in the second touch area 221 are linearly distributed at intervals along an extending direction of the short edges. In different second touch areas 221, a type (self-capacitance or mutual-capacitance) and number of the button portions 2211 may be the same or different.

Figure 3:
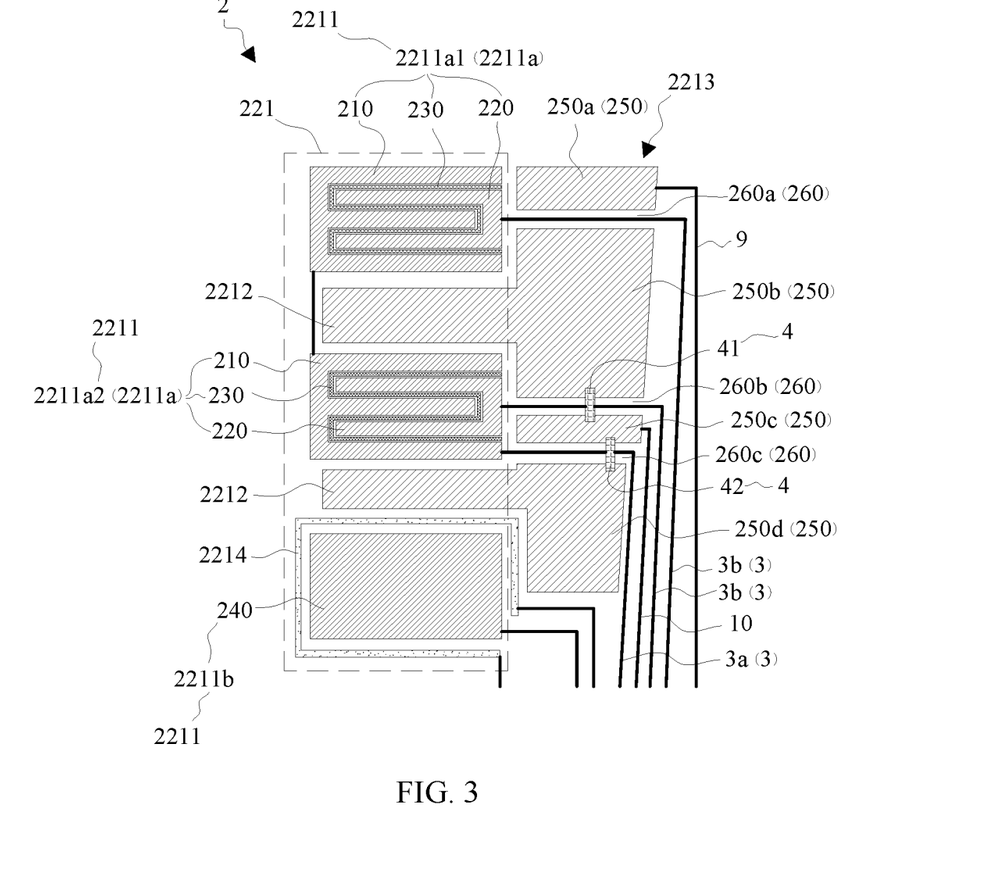
FIG. 3 is a partial schematic diagram of a touch panel according to an embodiment of the present disclosure.

Further, as shown in FIGS. 1 and 3, the plurality of button portions 2211 includes at least one mutual-capacitance button portion 2211a, and the mutual-capacitance button portion 2211a may include a first touch electrode 210, a second touch electrode 220 and a dummy electrode 230 disposed on a same layer. To form a capacitance, there is a gap between the first touch electrode 210 and the second touch electrode 220, the principle of mutual capacitance touch is not described in detail here. The dummy electrode 230 is disposed in the gap between the first touch electrode 210 and the second touch electrode 220, and is disposed to be spaced apart the first touch electrode 210 and the second touch electrode 220, that is, neither the first touch electrode 210 nor the second touch electrode 220 is in contact with the dummy electrode 230.

The first touch electrode 210, the second touch electrode 220, and the dummy electrode 230 may be made from a same transparent conductive material, such as ITO, and may be formed at the same time through a same patterning process. Moreover, the first touch electrode 210, the second touch electrode 220, and the dummy electrode 230 may also be formed at the same time as touch electrodes in the first touch area 21.

Shapes of the first touch electrode 210 and the second touch electrode 220 are not particularly limited here. The gap between the first touch electrode 210 and the second touch electrode 220 may extend along a track, such as a fold line, a curved line, etc., and a specific shape thereof depends on the shapes of the first touch electrode 210 and the second touch electrode 220. The dummy electrode 230 is a strip structure extending along the extending direction of the gap.

Figure 4:
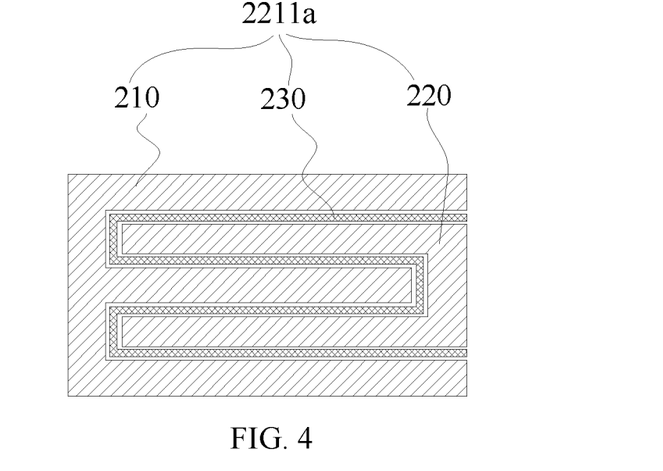
FIG. 4 is a schematic diagram of a mutual-capacitance button portion in a touch panel according to an embodiment of the present disclosure.

As shown in FIG. 4, in some embodiments of the present disclosure, the first touch electrode 210 and the second touch electrode 220 each include a connection segment and an extension segment(s). The connection segment extends along a straight line. There are multiple extension segments, which are coupled to a same side of the connection segment. However, the number of extension segments of the first touch electrode 210 may be different from that of the second touch electrode 220. In addition, individual extension segments are distributed at intervals along an extending direction of the connection segment and extend straight in a direction away from the connection segment.

The connection segment of the first touch electrode 210 and the connection segment of the second touch electrode 220 are disposed in parallel. The extension segments of the second touch electrode 220 are disposed between the extension segments of the first touch electrode 210 in a one-to-one correspondence, and are distributed alternately with the extension segments of the first touch electrode 210. Furthermore, the extension segments of the second touch electrode 220 are not in touch with the connection segment and the extension segments of the first touch electrode 210, so that the gap is formed between the first touch electrode 210 and the second touch electrode 220. Accordingly, the gap may extend along a fold line track, and a width of the gap is not specifically limited herein. The width is a distance between the first touch electrode 210 and the second touch electrode 220 in a direction perpendicular to the extending track of the gap. For example, the width of the gap may be 400 µm.

In other embodiments of the present disclosure, the first touch electrode 210 and the second touch electrode 220 may also have other shapes, so that the gap between the two may also extend along a track of other shapes such as a curved line or a straight line.

Further, as shown in FIG. 4, in the extending direction of the gap between the first touch electrode 210 and the second touch electrode 220, a center line of the dummy electrode 230 coincides with a center line of the gap and has a same length as the center line of the gap. The center line of the gap passes through a midpoint of a cross section of the gap, which is a cross section perpendicular to its extending direction. The center line of the dummy electrode 230 passes through a midpoint of a cross section of the dummy electrode 230, which is a cross section perpendicular to its extending direction. In addition, a distance between the dummy electrode 230 and the first touch electrode 210 may be 10 µm-30 µm, for example, 10 µm, 20 µm, or 30 µm. A distance between the dummy electrode 230 and the second touch electrode 220 is 10 µm-30 µm, for example, 10 µm, 20 µm, or 30 µm. Of course, the distance between the dummy electrode 230 and the first touch electrode 210 and the distance between the dummy electrode 230 and the second touch electrode 220 may be the same or different.

Further, as shown in FIGS. 1 and 3, the plurality of button portions 2211 in the same second touch area 221 may further include a self-capacitance button portion 2211b, and the self-capacitance button portion 2211b may include a third touch electrode 240. The third touch electrodes 240 may be made from ITO or other transparent conductive materials, and the third touch electrode 240 is disposed on a same layer as the first touch electrode 210 and the second touch electrode 220. A determination position may be determined by sensing a capacitance between the third touch electrode 240 and a finger. A principle of self-capacitance touch is not described in detail here.

In an embodiment of the present disclosure, as shown in FIGS. 1 and 3, there are three button portions 2211 in the second touch area 221, and the button portions 2211 include two mutual-capacitance button portions 2211a and one self-capacitance button portion 2211b. For example, the self-capacitance button portion 2211b may be used as a power key, and the two mutual-capacitance button portions 2211a may be used as a menu key and a return key respectively. Of course, the two mutual-capacitance button portions 2211a may also be used as volume up and down keys. Specific uses of the mutual-capacitance button portion 2211a and the self-capacitance button portion 2211b are not limited herein.

In some embodiments of the present disclosure, in order to avoid signal crosstalk between two adjacent button portions 2211, a first shielding body 2212 may be disposed between two adjacent button portions 2211, as shown in FIGS. 1 and 3. There are gaps between the first shielding body 2212 and the adjacent button portions 2211, and the first shielding body 2212 may be grounded. The first shielding body 2212 is made from ITO or other transparent conductive materials. Further, the first shielding body 2212 may be disposed on a same layer as the first touch electrode 210, the second touch electrode 220, and the dummy electrode 230, which are formed at the same time. The first shielding body 2212 may play a role of signal shielding, thereby preventing the signal crosstalk between two adjacent button portions 2211 and ensuring touch accuracy. In addition, the first shielding body 2212 may also fill the gap between the button portions 2211 to improve the optical uniformity of the second touch area 221.

Further, in some embodiments of the present disclosure, in order to prevent the signal crosstalk between the button portion 2211 and the first touch area 21, a second shielding body 2213 may be disposed between the second touch area 221 and the first touch area 21, and be coupled to the first shielding body 2212, as shown in FIGS. 1 and 3. There is a gap between the second shielding body 2213 and each button portion 2211 in the second touch area 221, and the second shielding body 2213 may be grounded. The second shielding body 2213 is made from ITO or other transparent conductive materials. Further, the second shielding body 2213 may be disposed on a same layer as the first touch electrode 210, the second touch electrode 220, the dummy electrode 230, and the first shielding body 2212, which may be formed at the same time.

If there is a water droplet on the self-capacitance button portion 2211b, a capacitance may be generated between the water droplet and the self-capacitance button portion 2211b.

After the capacitance sensed by the self-capacitance button portion 2211*b* changes, a triggering effect is generated without a finger touch, causing a phenomenon of automatic triggering or shutdown. For example, if the self-capacitance button portion 2211*b* is used as the power button, abnormal phenomena such as automatic startup or shutdown may occur due to water on the self-capacitance button portion 2211*b*. Therefore, as shown in FIGS. 1 and 3, in some embodiments of the present disclosure, the touch layer 2 further includes a protection wire 2214. The protection wire 2214 may be disposed around the self-capacitance button portion 2211*b* and is separated from the self-capacitance button portion 2211*b*. A shape of the self-capacitance button portion 2211*b* is an unclosed ring structure, and a protection signal may be input to the protection wire 2214. The protection wire 2214 may be regarded as another self-capacitance touch key capable of sensing changes in capacitance, and the protection signal is a signal for driving the self-capacitance touch key. Although the water droplet and a human body are both conductors, a difference in surface areas between the water droplet and the human body is significant, and impacts on the capacitance are quite different. Therefore, by properly setting the protection signal and a signal processing manner of the driving circuit board, the capacitance change generated by the water droplet is sensed by the protection wire 2214, and the self-capacitance button portion 2211*b* is closed once the capacitance change generated by the water droplet is sensed, that is, no driving signal is input to the self-capacitance button portion 2211*b*, so as to prevent the self-capacitance button portion 2211*b* from being triggered due to the water.

Further, a ratio of a width of the protection wire 2214 to a distance between the protection wire 2214 and the self-capacitance button portion 2211*b* is not less than 4/3. For example, the width of the protection wire 2214 is 2000 µm, and the distance between the protection wire 2214 and the self-capacitance button portion 2211*b* is 1500 µm.

As shown in FIGS. 1 and 3, in some embodiments of the present disclosure, the border area 22 further includes a bonding area 222 for bonding with the driving circuit board. Each button portion 2211 is coupled to the bonding area 222 via a touch wire 3. In addition, the protection wire 2214 may also be coupled to the bonding area 222 via a wire, and the bonding area 222 may be used to bond with the driving circuit board, so that the driving signal is input and grounded.

As shown in FIGS. 1 and 3, in order to avoid the touch wire 3, the second shielding body 2213 is provided with a wire groove(s) 260. The wire groove penetrates the second shielding body 2213 in a direction perpendicular to the substrate 1, so that the second shielding body 2213 is divided into a plurality of shielding units 250 that are separately distributed, and at least a part of touch wires 3 of the button portions 2211 are coupled to the bonding area 222 through the wire groove 260. Furthermore, there is only one touch wire 3 in each wire groove 260.

As shown in FIGS. 1 and 3, taking one second touch area 221 as an example, in some embodiments of the present disclosure, a shape of the first touch area 21 is rectangle with two long edges and two short edges. The second touch area 221 faces toward one of the short edges, and this short edge may be referred as a target short edge. There are three touch portions 2211 in the second touch area 221. The three touch portions 2211 include two mutual-capacitance button portions 2211*a* and one self-capacitance button portion 2211*b* linearly distributed along the target short edge. The two mutual-capacitance button portions 2211*a* include a first mutual-capacitance button portion 2211*a*1 and a second mutual-capacitance button portion 2211*a*2. The bonding area 222 corresponds to one of the long edges of the first touch area 21, and the second mutual-capacitance button portion 2211*a*2 is located between the first mutual-capacitance button portion 2211*a*1 and the self-capacitance button portion 2211*b*.

There are two first shielding bodies 2212, one of which is located between the first mutual-capacitance button portion 2211*a*1 and the second mutual-capacitance button portion 2211*a*2, and the other is located between the second mutual-capacitance button portion 2211*a*2 and the self-capacitance button portion 2211*b*. There are three wire grooves 260 including a first wire groove 260*a*, a first wire groove 260*b*, and a first wire groove 260*c*, so that the second shielding body 2213 is divided into four shielding units 250. The four shielding units 250 are linearly distributed in a direction parallel to the target short edge, and include a first shielding unit 250*a*, a second shielding unit 250*b*, a third shielding unit 250*c*, and a fourth shielding unit 250*d* that are sequentially distributed toward the bonding area 222. The first wire groove 260*a* is located between the first shielding unit 250*a* and the second shielding unit 250*b*, the second wire groove 260*b* is located between the second shielding unit 250*b* and the third shielding unit 250*c*, and the third wire groove 260*c* is located between the third shielding unit 250*c* and the fourth shielding unit 250*d*.

Each first shielding body 2212 and a shielding unit 250 corresponding to the gap where the first shielding body 2212 is located are formed as an integral structure. For example, the first shielding unit 250*a* corresponds to a part of the first mutual-capacitance button portion 2211*a*1, and the third shielding unit 250*c* corresponds to a part of the second mutual-capacitance button portion 2211*a*2; the second shielding unit 250*b* is formed as an integral structure with the first shielding body 2212 between and the first mutual-capacitance button portion 2211*a*1 and the second mutual-capacitance button portion 2211*a*2; the fourth shielding unit 250*d* is formed as an integral structure with the first shielding body 2212 between the self-capacitance button portion 2211*b* and the second mutual-capacitance button portion 2211*a*2.

Further, the first touch electrodes 210 of the two mutual-capacitance button portions 2211*a* are coupled, and the first touch electrode 210 of one of the mutual-capacitance button portions 2211*a* is coupled to the bonding area 222 via a touch wire 3 passing through the wire groove 260. The second touch electrode 220 of each mutual-capacitance button portion 2211*a* is coupled to the bonding area 222 via a touch wire 3 passing through the wire groove 260, and the touch wires 3 of the second touch electrodes 220 of the two mutual-capacitance button portions 2211*a* are different. For example, as shown in FIG. 3, the touch wires 3 include one first touch wire 3*a* and two second touch wires 3*b*. The first touch electrodes 210 of the first mutual-capacitance button portion 2211*a*1 and the second mutual-capacitance button portion 2211*a*2 are connected in series to the same first touch wire 3*a*, and are coupled to the bonding area 222 via the first touch wire 3*a*. The second touch electrode 220 of the first mutual-capacitance button portion 2211*a*1 may be coupled to the bonding area 222 via a second touch wire 3*b* passing through the first wire groove 260*a*; the second touch electrode 220 of the second mutual-capacitance button portion 2211*a*2 may be coupled to the bonding area 222 via another second touch wire 3*b* passing through the second wire groove 260*b*.

The first touch electrode 210 of the mutual-capacitance button portion 2211a may be used as an emitting electrode, that is, a driving electrode, and the second touch electrode 220 may be used as a receiving electrode, that is, a sensing electrode. During operation, the driving circuit board coupled to the bonding area 222 may simultaneously input driving signals to the first touch electrode 210 of each mutual-capacitance button portion 2211a, and the second touch electrodes 220 of individual mutual-capacitance button portions 2211a may independently feedback sensing signals to the driving circuit board to determine a touch position. The basic principle of mutual capacitance touch is not detailed here.

As shown in FIGS. 1 and 2, in order to electrically connect different shielding units 250, the touch panel further includes a bridging layer 4 and an insulating layer 6.

The bridging layer 4 may be disposed on a side of the substrate 1, and may be made from metal or other conductive materials.

The insulating layer 6 covers the bridging layer 4. The insulating layer 6 is made from a transparent insulating material, for example, photoresist or the like. The touch layer 2 may be disposed on a surface of the insulating layer 6 away from the substrate 1, and at least two adjacent shielding units 250 may be coupled to the bridging layer 4 through via holes penetrating the insulating layer 6, thereby reducing the number of leads connecting the second shielding body 2213 to the bonding area 222.

In some embodiments of the present disclosure, as shown in FIG. 2, the bridging layer 4 may include a plurality of strip-shaped bridging bodies, and an extending direction of the bridging bodies may intersect with the wire groove 260, so as to connect the shielding units 250 on both sides of the wire groove 260. For example, as shown in FIG. 3, the bridging layer 4 includes a first bridging body 41 and a second bridging body 42. The first bridging body 41 and the second wire groove 260b are located on different layers, and extending directions thereof cross. The second shielding unit 250b and the third shielding unit 250c are coupled to the first bridging body 41 through a via hole, so that the second shielding unit 250b and the third shielding unit 250c are connected through the first bridging body 41. Similarly, the third shielding unit 250c and the fourth shielding unit 250d may be connected through the second bridging body 42.

In some embodiments of the present disclosure, as shown in FIGS. 1 and 3, in order to strengthen a signal shielding effect and avoid signal interference between the second touch area 221 and the first touch area 21, the border area 22 may be provided with a first shielding wire 9. At least a part of the first shielding wire 9 is located between the second shielding body 2213 and the first touch area 21, and is coupled to the bonding area 222 and grounded, so as to play a role of signal isolation. The touch wires 3 coupled to individual first touch electrodes 210 are all located on a side of the first shielding wire 9 away from the first touch area 21. Further, the first shielding wire 9 is coupled to the first shielding unit 250a, and the first shielding unit 250a is grounded through the first shielding wire 9 instead of connecting the first shielding unit 250a and the second shielding unit 250b through the bridging layer 4, so as to reduce the process difficulty. On the other hand, only the second shielding unit 250b and the third shielding unit 250b are connected through the bridging layer 4, and the third shielding unit 250c and the fourth shielding unit 250d are connected through the bridging layer 4. Further, the third shielding unit 250c is coupled to the bonding area 222 through the second shielding wire 10 and grounded, thereby grounding the second shielding unit 250b, the third shielding unit 250c, and the fourth shielding unit 250d.

Further, in some embodiments of the present disclosure, as shown in FIGS. 1 and 3, the second shielding wire 10 is located between the first touch wire 3a and the second touch wire 3b connecting the second touch electrodes 220 of the second mutual-capacitance button portions 2211a2, so as to avoid signal crosstalk between the first touch wire 3a and the second touch wire 3b on both sides of the second shielding wire 10.

Further, in some embodiments of the present disclosure, as shown in FIG. 1, in order to improve the shielding effect and avoid interference from the outside to the touch panel, a third shielding wire 11 surrounding the first touch area 21 may be disposed on an edge of the border area 22, and the second touch area 221 is located within a range surrounded by the third shielding wire 11. The third shielding wire 11 may be coupled to the bonding area 222 and grounded, so as to further improve the shielding effect and prevent interference from the outside to the touch panel.

In order to improve performance of the touch wire 3, as shown in FIGS. 1 and 2, in some embodiments of the present disclosure, the touch wire 3 may include a first conductive layer 31 and a second conductive layer 32.

The first conductive layer 31 may be disposed on the same layer as the touch layer 2 and has the same material as the touch layer 2. For example, the material of these two layers is ITO, so that they may be formed at the same time through one patterning process.

The second conductive layer 32 may be disposed on a surface of the first conductive layer 31 away from the substrate 1, and a boundary of an orthographic projection of the second conductive layer 32 on the substrate 1 coincides with that of the first conductive layer 31. A material of the second conductive layer 32 is metal, and its conductivity is higher than that of the first conductive layer 31, so as to improve the conductive performance of the touch wire 3.

Of course, in other embodiments of the present disclosure, the touch wire 3 may also be a single layer with only the first conductive layer 31 or the second conductive layer 32, or may also be a multi-layer structure with more than two layers.

In addition, any one of the first shielding wire 9, the second shielding wire 10, and the third shielding wire 11 may also have a multi-layer structure, and may also include a film layer on the same layer and with the same material as the first conductive layer 31 and the second conductive layer 32. Of course, any one of the first shielding wire 9, the second shielding wire 10, and the third shielding wire 11 may also have a single-layer structure.

As shown in FIGS. 1 and 2, in some embodiments of the present disclosure, the touch panel may further include a second blocking layer 7 and a protective layer 8.

The second blocking layer 7 covers the second conductive layer 32 and the touch layer 2, and a material of the second blocking layer 7 may be the same as that of the first blocking layer 5.

The protective layer 8 covers the second blocking layer 7, and its material may be a transparent insulating material such as photoresist, and its material may be the same as the insulating layer 6.

The present disclosure provides a display device that may include a display panel and a touch panel.

The display panel may be an OLED display panel or a liquid crystal display panel, and its specific structure is not specifically limited here. In addition, the display panel may have a display area and a peripheral area surrounding the display area. The display area is configured to emit light to display an image, and the peripheral area may be configured to dispose a driving circuit.

The touch panel is disposed on a side of the display panel, and the substrate is located on a side of the touch layer away from the display panel; an orthographic projection of the first touch area on the display panel is located in the display area, and an orthographic projection of the border area on the display panel is located in the peripheral area. The touch panel may be the touch panel of any of the above embodiments, so its structure and beneficial effects may refer to the above-mentioned touch panel embodiments, which will not be repeated here.

The embodiments of the present disclosure further provide a manufacturing method of a touch panel. The touch panel is the touch panel of any of the above embodiments, and its structure is not described in detail here. The manufacturing method may include:

providing a substrate;

forming a touch layer on a side of the substrate, where the touch layer includes a first touch area and a border area surrounding the first touch area; the border area includes at least one second touch area, and the second touch area includes a plurality of button portions 2211; the plurality of button portions 2211 includes at least one mutual-capacitance button portion 2211a, and the mutual-capacitance button portion 2211a includes a first touch electrode, a second touch electrode, and a dummy electrode disposed in a same layer, and there is a gap between the first touch electrode and the second touch electrode. The dummy electrode is disposed in the gap between the first touch electrode and the second touch electrode, and separated from the first touch electrode and the second touch electrode.

Details of the touch panel in the manufacturing method according to the embodiments of the present disclosure have been described in the embodiments of the touch panel. For details, please refer to the embodiments of the touch panel, which will not be described in detail here.

In some embodiments of the present disclosure, before forming the touch layer, the manufacturing method of the present disclosure may further include:

forming a bridging layer on a side of the substrate; and forming an insulating layer covering the bridging layer;

the touch layer is disposed on a surface of the insulating layer away from the substrate, and at least two adjacent shielding units are coupled by the bridging layer.

It should be noted that although the various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Other embodiments of the present disclosure will be apparent to those skilled in the art after those skilled in the art consider the specification and practice the technical solutions disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A touch panel, comprising:

a substrate;

a bridging layer, disposed on a side of the substrate;

an insulating layer, covering the bridging layer; and a touch layer, disposed on a side of the substrate and comprising a first touch area and a border area surrounding the first touch area; wherein the border area comprises at least one second touch area, and the second touch area comprises a plurality of button portions; wherein a second shielding body is disposed between the second touch area and the first touch area;

the border area further comprises a bonding area for bonding with a driving circuit board; the second shielding body is provided with at least one wire groove, and the wire groove is configured to divide the second shielding body into a plurality of shielding units distributed at intervals, and at least one touch wire is coupled to the bonding area by passing through the wire groove; and the touch layer is disposed on a surface of the insulating layer away from the substrate, and at least two adjacent shielding units are coupled by the bridging layer.

2. The touch panel according to claim 1, wherein the plurality of button portions comprise at least one mutual-capacitance button portion, and the mutual-capacitance button portion comprises a first touch electrode, a second touch electrode, and a dummy electrode disposed in a same layer, and there is a gap between the first touch electrode and the second touch electrode, and the dummy electrode is disposed in the gap between the first touch electrode and the second touch electrode, and separated from the first touch electrode and the second touch electrode respectively; and each of the button portions is coupled to the bonding area through the touch wire.

3. The touch panel according to claim 2, wherein the gap between the first touch electrode and the second touch electrode extends along a curved or fold line track; the dummy electrode is a strip structure extending along an extending direction of the gap; and in the extending direction of the gap, a center line of the dummy electrode coincides with a center line of the gap.

4. The touch panel according to claim 2, wherein a distance between the dummy electrode and the first touch electrode is 10 μm-30 μm; and a distance between the dummy electrode and the second touch electrode is 10 μm-30 μm.

5. The touch panel according to claim 2, wherein a first shielding body is disposed between two adjacent button portions in a same second touch area, and the first shielding body is separated from the two adjacent button portions.

6. The touch panel according to claim 5, the touch wire comprises:

a first conductive layer, disposed on a same layer as the touch layer; and a second conductive layer, disposed on a surface of the first conductive layer away from the substrate, wherein a boundary of an orthographic projection of the second conductive layer on the substrate coincides with a boundary of an orthographic projection of the first conductive layer on the substrate; and a material of the second conductive layer is metal.

7. The touch panel according to claim 2, wherein the plurality of button portions in a same second touch area further comprise a self-capacitance button portion, and the self-capacitance button portion comprises a third touch electrode disposed on a same layer as the first touch electrode and the second touch electrode.

8. The touch panel according to claim 7, wherein the touch layer further comprises:
a protection wire, disposed around the self-capacitance button portion, and configured to input a protection signal.

9. The touch panel according to claim 8, wherein a ratio of a width of the protection wire to a distance between the protection wire and the self-capacitance button portion is not less than 4/3.

10. The touch panel according to claim 5, wherein the first shielding body is grounded, and the second shielding body is grounded.

11. The touch panel according to claim 5, wherein the first shielding body and the second shielding body are disposed on a same layer as the first touch electrode, the second touch electrode, and the dummy electrode.

12. The touch panel according to claim 1, wherein there is only one touch wire in one wire groove.

13. The touch panel according to claim 5, wherein each first shielding body and a shielding unit corresponding to the gap where the first shielding body is located are formed as an integral structure.

14. The touch panel according to claim 1, wherein the plurality of shielding units comprise a first shielding unit and a third shielding unit;
a first shielding wire is coupled to the first shielding unit, and the first shielding unit is grounded through the first shielding wire; and
the third shielding unit is coupled to the bonding area through a second shielding wire and is grounded.

15. The touch panel according to claim 1, wherein a third shielding wire surrounding the first touch area is disposed on an edge of the border area, and the second touch area is disposed within a range surrounded by the third shielding wire.

16. The touch panel according to claim 1, wherein a side of the substrate is covered with a first blocking layer; and
the touch panel further comprises a second blocking layer and a protective layer.

17. The touch panel according to claim 7, wherein the plurality of shielding units comprise a fourth shielding unit;
the at least one mutual-capacitance button portion comprises a second mutual-capacitance button portion; and
the fourth shielding unit and the first shielding body between the self-capacitance button portion and the second mutual-capacitance button portion are formed as an integral structure.

18. The touch panel according to claim 1, wherein the at least one wire groove comprises a second wire groove;
the plurality of shielding units comprise a second shielding unit, a third shielding unit and a fourth shielding unit; and
the bridging layer comprises a first bridging body and a second bridging body, the first bridging body and the second wire groove are disposed on different layers, and extending directions of the first bridging body and the second wire groove cross, the second shielding unit and the third shielding unit are coupled to the first bridging body through a via hole, so that the second shielding unit and the third shielding unit are connected through the first bridging body, the third shielding unit and the fourth shielding unit is connected through the second bridging body.

19. The touch panel according to claim 8, wherein the protection wire is coupled to the bonding area via a wire.

20. A display device, comprising:
a display panel, comprising a display area and a peripheral area surrounding the display area; and
a touch panel disposed on a side of the display panel, wherein
the touch panel comprises:
a substrate;
a bridging layer, disposed on a side of the substrate;
an insulating layer, covering the bridging layer; and
a touch layer, disposed on a side of the substrate and comprising a first touch area and a border area surrounding the first touch area; wherein the border area comprises at least one second touch area, and the second touch area comprises a plurality of button portions; wherein
a second shielding body is disposed between the second touch area and the first touch area;
the border area further comprises a bonding area for bonding with a driving circuit board; the second shielding body is provided with at least one wire groove, and the wire groove is configured to divide the second shielding body into a plurality of shielding units distributed at intervals, and at least one touch wire is coupled to the bonding area by passing through the wire groove; and
the touch layer is disposed on a surface of the insulating layer away from the substrate, and at least two adjacent shielding units are coupled by the bridging layer.

* * * * *